US005639040A

United States Patent [19]

Honjo

[11] Patent Number: 5,639,040
[45] Date of Patent: Jun. 17, 1997

[54] APPARATUS FOR DETECTNG ABNORMALITY OF A TAPE-TENSION DETECTING MEANS OF A MAGNETIC RECORDING APPARATUS

[75] Inventor: Ryoki Honjo, Tokyo, Japan

[73] Assignee: Sony Corporation, Japan

[21] Appl. No.: 275,363

[22] Filed: Jul. 15, 1994

[30] Foreign Application Priority Data

Jul. 21, 1993 [JP] Japan ..................... 5-180325

[51] Int. Cl.$^6$ ............................... B65H 59/38
[52] U.S. Cl. .................. 242/334; 242/334.3; 242/334.4
[58] Field of Search ................... 242/334, 334.1, 242/334.2, 334.3, 334.4, 334.5, 334.6, 352.1, 352.2; 318/6, 7; 360/73.04, 73.09, 73.11

[56] References Cited

U.S. PATENT DOCUMENTS

| | | |
|---|---|---|
| 4,398,227 | 8/1983 | Anderson .................... 318/7 |
| 4,461,433 | 7/1984 | Kani ............................ 318/7 |
| 4,786,992 | 11/1988 | Tajima et al. .............. 242/334.4 |
| 4,807,107 | 2/1989 | Fincher ..................... 242/334.6 |
| 5,039,027 | 8/1991 | Yanagihara et al. ....... 242/334.2 |
| 5,222,684 | 6/1993 | Yoneda et al. ............. 242/334.2 |
| 5,248,112 | 9/1993 | Rodal et al. ................ 242/334 |
| 5,259,563 | 11/1993 | Kakiwaki et al. .......... 242/334.3 |
| 5,330,118 | 7/1994 | Yoshikawa ................. 242/334.4 |

Primary Examiner—John P. Darling
Attorney, Agent, or Firm—Ronald P. Kananen

[57] ABSTRACT

There are provided the CPU 19, the supply-side reel motor 20 and the D/A convertor and motor driver 22 which drive the supply-side reel in an open-loop fashion with cutting off the supply-side-reel servo drive, the CPU 19, the supply-side reel motor 20 and the FG counter 21 which set the target tension in the open loop, and the CPU 19 and the nonvolatile storage 24 which compare the target tension and the tape tension detected by the tension sensor 13 and detects abnormality of the tension sensor 13.

8 Claims, 6 Drawing Sheets

Result Output Process

APPARATUS FOR DETECTING ABNORMALITY OF A TAPE-TENSION DETECTING MEANS OF A MAGNETIC RECORDING APPARATUS

BACKGROUND OF THE INVENTION

The present invention relates to an apparatus for detecting abnormality of a tension sensor of a magnetic recording apparatus suitable for use in a data recorder, for example.

In a magnetic recording apparatus such as a data recorder or the like, control of tape tension for controlling a reel motor of a supply-side reel is performed on the basis of a tape tension detected by a tension sensor disposed at a tape traveling path so that a tape can be traveled with a predetermined tension.

As a method of the tension control, there is a method of open-loop control in which a predetermined current is supplied to the supply-side reel motor to generate a necessary torque and a method of feed-back control in which a value of the tape tension detected by the tension sensor is fed back to control the supply-side reel motor.

In a tape traveling mode, since a tape is required to slide on and brought in contact with a part of the outer peripheral end surface of a drum to enable magnetic recording, a precise value of the tape tension needs to be maintained. For these reasons, a feed-back control which allows fine control is frequently adopted.

However, a magnetic recording apparatus performing the above-mentioned feed-back control of the tape tension encounters by such a disadvantage that if the tension sensor becomes out of order and malfunctions, then not only is the correct tape tension is prevented from being maintained but also the tape is prevented from being properly sliding on the outer peripheral end surface of the drum, with the result that correct recording and reproduction is prevented and the tape is apt to be damaged.

SUMMARY OF THE INVENTION

In view of such aspects, an object of the present invention is to provide an apparatus for detecting abnormality of a tape-tension detecting means or a malfunction in recording apparatus which can detect an abnormality of the tension sensor with high accuracy and prevent the tape from being damaged.

According to the present invention, for example, in the magnetic recording apparatus which has the tape-tension detecting means for detecting tension of a tape loaded on a predetermined tape traveling path from a supply-side reel to a takeup-side reel and supply-side-reel servo driving means for controlling rotation of the supply-side reel on the basis of a detected value of tape tension detected by the tape-tension detecting means and which gives a tape tension in response to a tape traveling mode, the apparatus for detecting abnormality of the tape-tension detecting means of the magnetic recording apparatus comprises supply-side-reel open-loop driving means for driving the supply-side reel in an open-loop fashion while cutting off servo drive performed by the supply-side-reel servo driving means, target-tension setting means for setting a target tension in the open loop made by the supply-side-reel open-loop driving means, and a means for detecting abnormality of the tape-tension detecting means which compares the target tension obtained by the target-tension setting means and the tape tension detected by the tape-tension detecting means and detects abnormality of the tape-tension detecting means.

According to the apparatus for detecting abnormality of the tape-tension detecting means of the magnetic recording apparatus of the present invention, for example, the target-tension setting means generates such a supply-side reel torque that the backward tension of the supply-side reel becomes the above-mentioned target tension.

According to the apparatus for detecting abnormality of the tape-tension detecting means of the magnetic recording apparatus of the present invention, for example, the target-tension setting means sets a current value for driving the supply-side reel motor so that a supply-side reel torque should be generated.

According to the apparatus for detecting abnormality of the tape-tension detecting means of the magnetic recording apparatus of the present invention, for example, the target-tension setting means previously detects that the supply-side reel torque is free from abnormality.

DETAILED DESCRIPTION OF THE PREFERRED EMBODIMENTS

One embodiment of an apparatus for detecting abnormality of a tape-tension detecting means of a magnetic recording apparatus according to the present invention will hereinafter be explained in detail with reference to FIGS. 1 to 7. The magnetic recording apparatus is an apparatus for converting data transferred from a host computer as a high-order apparatus into data formatted in DD-1 format which is a format of magnetic recording standardized by ANSI (American National Standards Institute) and magnetically recording the latter. In the magnetic recording apparatus such as the data recorder or the like, the apparatus for detecting abnormality of the tape-tension detecting means has a function to check by itself whether or not a tension sensor for detecting whether or not tape tension upon tape traveling in the data recorder precisely functions and to detect an error.

Figure 1:
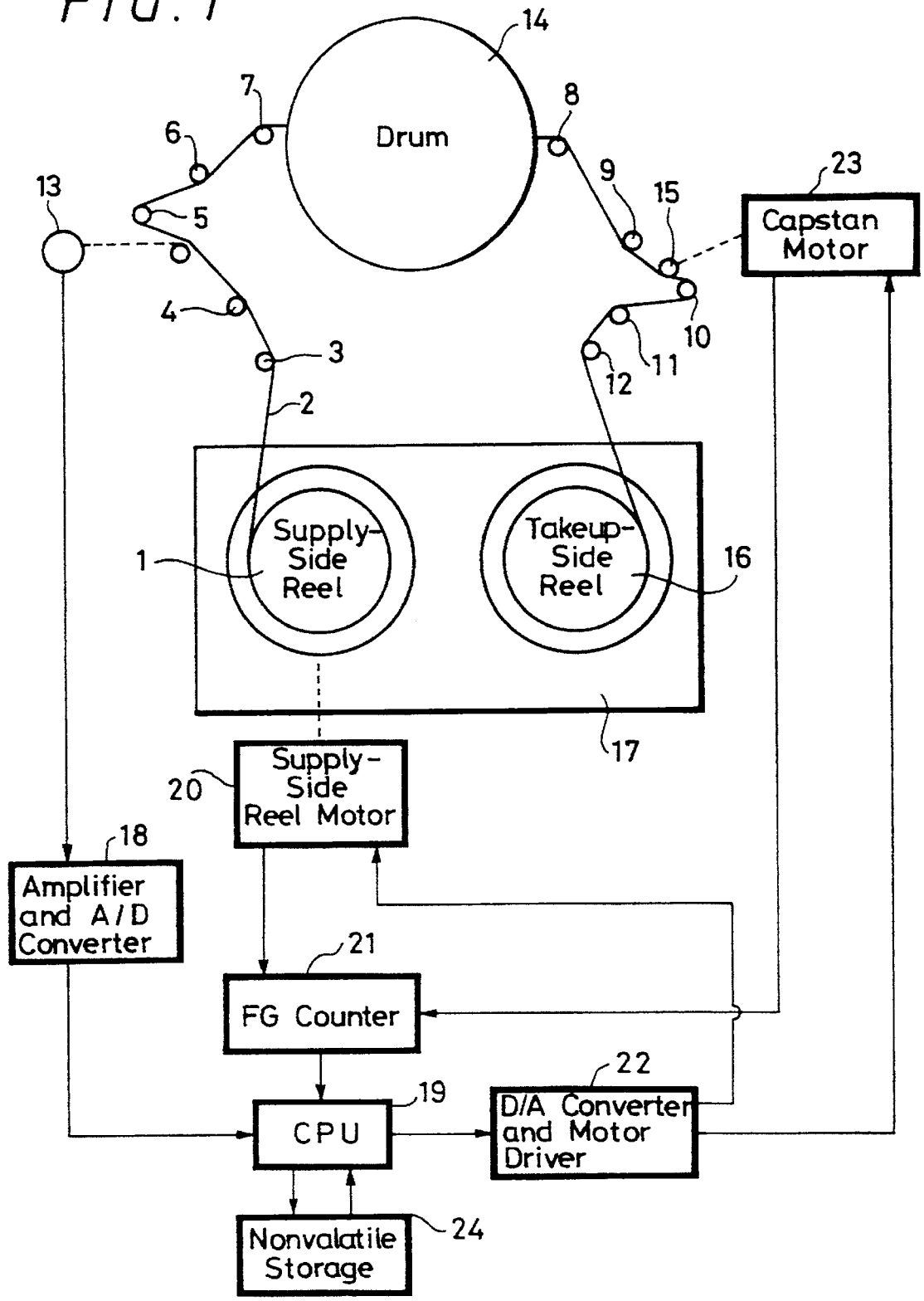
FIG. 1 is a block diagram showing an apparatus for detecting abnormality of a tape-tension detecting means of a magnetic recording apparatus according to one embodiment of the present invention.

The apparatus for detecting abnormality of the tape-tension detecting means of the magnetic recording apparatus according to the present invention is constructed as shown in FIG. 1. A cassette 17 is loaded in such a manner that a tape 2 travels from a supply-side reel 1 through predetermined guides 3 to 12, a tension sensor 13, a drum 14 and a capstan 15 which is brought in contact with the tape 2 and rotated, whereby the tape 2 is taken up around a take-up side reel 16. A helical head provided on the drum 14 magnetically records data on the tape 2. Here, construction of a signal system for magnetic recording will be omitted.

An output of the tension sensor 13 for detecting the tension of the tape 2 traveling along such path is supplied to an amplifier and A/D converter 18, where the output is converted into a digital data and then supplied to a CPU 19. The CPU 19 detects a winding diameter of the tape 2 by the output from an FG counter 21 of a supply-side reel motor 20 upon detection of the tension by the tension sensor 13 and commands a D/A convertor and motor driver 22 so that the tape tension should have a constant value, thereby controlling the supply-side reel motor 20 and a capstan motor 23. A nonvolatile storage or memory 24 serves to store a predetermined calculated value in order to detect a torque of the supply-side reel motor 20 when a servo control of the supply-side reel motor 20 is cut off by the CPU 19 and changed to an open-loop control.

In such construction, it can be regarded that a backward tension produced by the torque of the supply-side reel 1 and a tension detected by the tension sensor 13 are equal to each other or differ from each other by a certain difference. It is already checked by a torque check of a self-check function in a state in which the tape is not loaded that the supply-side reel motor 20 can be subjected to a highly accurate torque control by the open loop control. On the assumption of the above two facts, for example, an operator designates a mode of detection of the tape tension after a power is turned on and before magnetic recording is commenced, whereby the CPU 19 sets control of the supply-side reel motor 20 to the open-loop control and sets a target tension to detect whether or not a value of the tape tension detected by the tension sensor 13 falls within a permissible range relative to the target tension.

Such apparatus for detecting abnormality of the tape-tension detecting means of the magnetic recording apparatus operates in detail as follows. Operational principle thereof will first be explained. Assuming that reference letter I represents "a moment of inertia of a reel table (in the case where the tape is not loaded)" (which is a constant; previously known), reference letter Q represents "a rotational angular acceleration detected by the FG counter of the reel motor" (which is to be measured), reference letter A represents "a drive current for the reel motor" (controlled amount), reference letter G represents "a torque of the reel motor, that is, a current gain", reference letter Z represents "friction torque" and reference letter T represents "an effective torque of the reel motor", then an equation of $$\begin{aligned} T &= A*G-Z \\ &= (\text{"the target tension"} + \text{"a tension error"} * \\ &\quad \text{"a DC feedback gain"}) * \text{"the winding diameter} \\ &\quad \text{(a radius) of the supply-side reel"} \end{aligned}$$

is established. In case of the open-loop control, an equation of "the DC feedback gain"=0 is established, so that values of the current gain G and the friction torque Z are precisely measured and stored in the nonvolatile storage 24.

The supply-side reel motor 20 is driven by supplying a current value A to a driving circuit which can be controlled, and it is utilized that the torque of the motor 20 is in proportion to a driving current. Two values or more of a driving current are calculated and an angular acceleration is measured, whereby the values of the current gain G and the friction torque Z can be calculated from the above equation. In the above equation, "the tension error"="a measured tension"− "the target tension" is established. Further, in the above equation, only an absolute-value (DC) control is mentioned and a fluctuation-suppress (AC) control is omitted.

Figure 2:
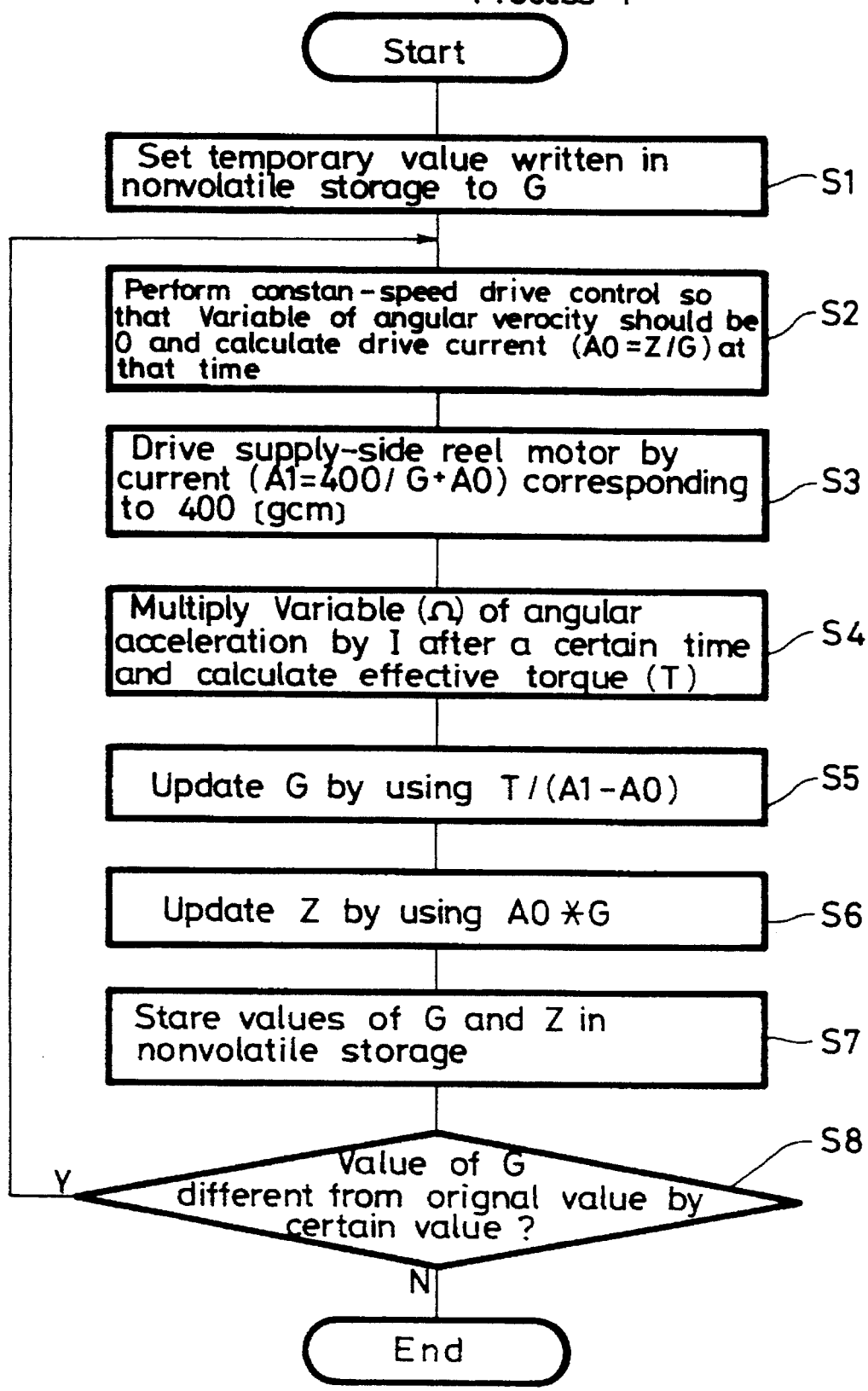
FIG. 2 is a diagram used to explain operation of the apparatus for detecting abnormality of the tape-tension detecting means of the magnetic recording apparatus according to one embodiment of the present invention.

A program for performing such operations is stored in the CPU. As shown in FIG. 2, a check process A for calculating the target tension consists of two processes which operate independently in a time-division fashion. In a process 1 for calculating the values of the current gain G and the friction torque Z, a temporary value previously written in the non-volatile storage 24 is first set to G at step S1.

At step S2, control for constant-speed drive is performed so that "a variable of an angular velocity" should be 0, and the drive current (A0=Z/G) at that time is calculated. At step S3, the supply-side reel motor is driven by the current (A1 =400/G+A0) corresponding to 400 [gcm]. At step S4, after a certain time, the value of "a variable of an angular acceleration" is multiplied by the value of I, and then the effective torque (T) is calculated. At step S5, the value of G is updated by using an equation of G=T/(A1−A0).

At step S6, the value of Z is updated by using an equation of Z=A0 * G. At step S7, the values of G and Z are stored in the nonvolatile storage 24. At step S8, if the value of G is different from the former value thereof by a value exceeding a certain value, then the processes from step S2 to step S7 are repeated in order to improve accuracy, and the process is finished.

Figure 3:
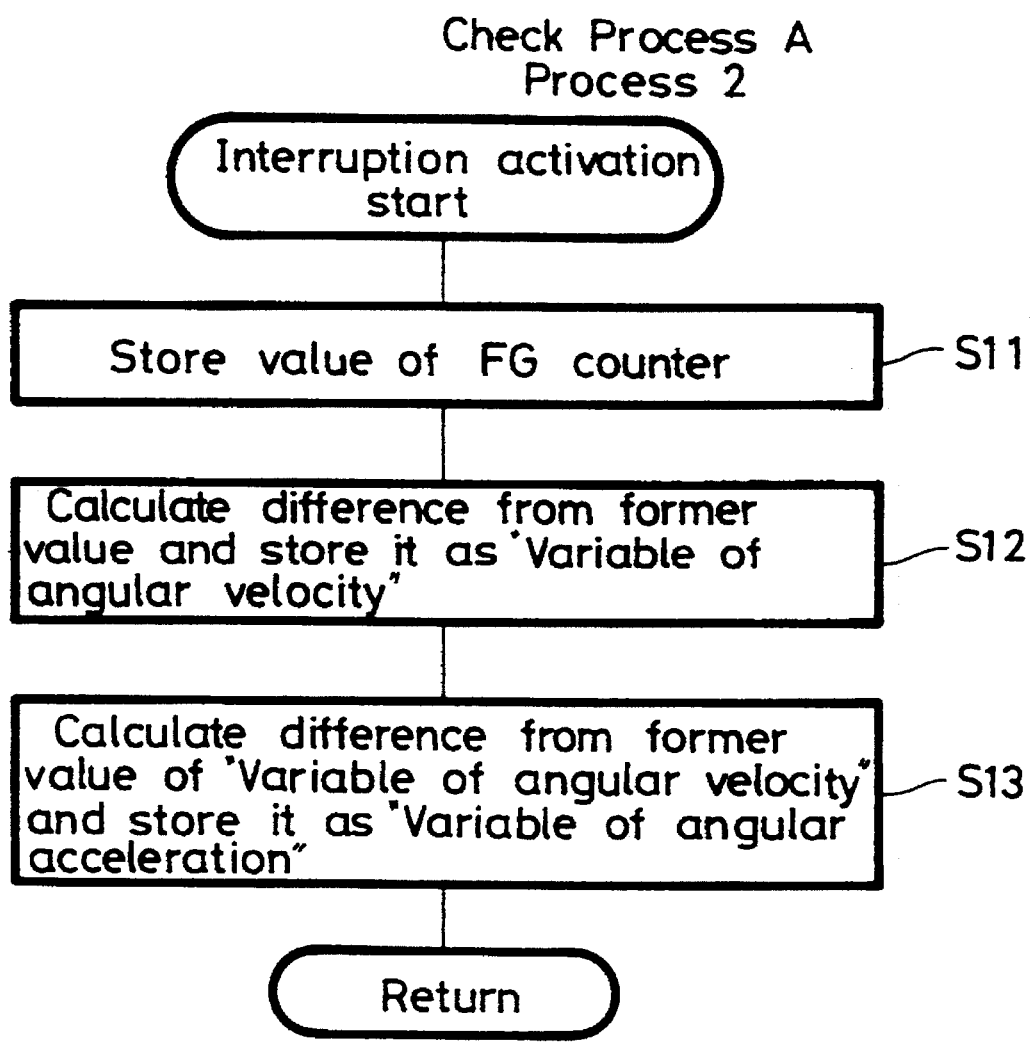
FIG. 3 is a diagram used to explain operation of the apparatus for detecting abnormality of the tape-tension detecting means of the magnetic recording apparatus according to one embodiment of the present invention.

In a process 2 activated in an interruption fashion at a certain interval of time, as shown in FIG. 3, a value of the FG counter is stored at step S11. At step S12, difference from the former value is calculated and stored as "the variable of the angular velocity". At step S13, difference from the former value of "the variable of the angular velocity" is calculated and then stored as "the variable of the angular acceleration", and then the process is returned. In the apparatus according to the present embodiment, since unevenness of the moment of inertia of the supply-side reel table is sufficiently small in the same kind of apparatus, the moment I of inertia is written as a previously known value in a firmware.

If the same firmware copes with plural kinds of the supply-side reel tables, measurement is previously performed by using a weight, whose moment of inertia is known, as a necessary member in two cases of the case where it is loaded on the supply-side reel table and the case where it is not loaded thereon, whereby the value of the moment I of inertia is automatically calculated.

The capstan is previously driven in an initial operation upon the loading of the tape or the like and "the winding diameter of the supply-side reel" is always updated by using FG informations of both of the supply-side and takeup-side reels on the basis of data obtained from FG information of the capstan, whereby "the winding diameter of the supply-side reel" can be obtained. The function is a function which has been executed in order to calculate a remaining amount of the tape, so that there will be omitted explanation about each step of a check process B for calculating "the winding diameter of the supply-side reel". Principle thereof will hereinafter be explained.

Assuming that reference numeral r1 represents "the winding diameter of the supply-side reel", reference numeral f1 represents "an angular velocity of the supply-side reel", reference numeral r2 represents "a winding diameter of the takeup side reel" and reference numeral f2 represents "an angular velocity of the takeup-side reel", then equations of r1 * f1=r2 * f2 and $r1^2+r2^2=c$ (constant) are established, so that an equation of r1=sqrt (c/ $((1+(f1/f2))^2)$) is established. Assuming that reference letter v represents a tape speed upon driving the capstan (constant), reference numeral f10 represents the value of f1 upon driving the capstan (constant) and reference numeral f20 represents a value of f2 upon driving the capstan (constant), then equation of r1 * f1=r2 * f2=v is established, so that establishment of equation of $c=v^2 * (1/(f10^2)+1/(f20^2))$ is understood.

As described above, the winding diameter of the supply-side reel can be always calculated from ratio of the angular velocities obtained from the FG information of both supply-side and takeup-side reels. If a thickness of the tape is already known, then accuracy in measurement of the winding diameter can be improved by utilizing the fact that increase or decrease of the winding diameter during one rotation of the reel is equal to the tape thickness.

As described above, when the function to detect abnormality of the tension sensor is activated, in "a main process" managing a self-check function, a command to perform "a constant-speed traveling without using the capstan" in which the feedback control is usually performed is issued to "a system control process" and then "a process controlling process" for checking a tension system is activated as an interruption activation process. A check process C is invoked as a subroutine of "the process controlling process". Therefore, a value of "the DC feedback gain" is set to "0", and control is changed to the open-loop control in a constant-speed mode in which the feedback control is always performed. Then, the supply-side reel motor 20 is driven to travel the tape 2. At this time, the fluctuation suppress control may be kept being performed.

In "the reel control process", there is performed such control that 45 [gf], for example, is selected as "the target tension", "the supply-side reel torque" is calculated from a term of 45 [gf] * "the winding diameter of the reel" so that the same backward tension should be 45 [gf] even if "the winding diameter of the reel" is changed, and a value corresponding to a drive current generating the torque is calculated to keep the D/A converter and motor driver 22 set.

In practice, the CPU of the check system also serves as the CPU for controlling the reel, so that "the target tension" can be directly obtained from the variable in the memory by the check process. Therefore, in the tape traveling mode, in "the reel control process", "the target tension" is set to a constant value stored in the firmware, and "the supply-side reel torque" is controlled with being calculated from a term of "target tension" * "the winding diameter of the supply-side reel" so that "the target tension" should be kept constant even if "the winding diameter of the reel" is changed. Next, in a check process C, in order to prevent an erroneous check resulting from tension fluctuation caused by external disturbance or the like, "a counter for the number of invocation", for example, is used to thereby perform a processing to average "tension measured by the tension sensor" for three seconds.

Then, in the check program C, "the target tension" and "averaged measured tension" are compared. If difference therebetween exceeds the standard value written in the firmware, then it is judged that the tension sensor is out of order. Then, an error message such as "Sensed tension doesn't correspond to S reel torque" or the like is displayed on a display panel or the like to thereby urge an operator to maintain the tension sensor.

Figure 4:
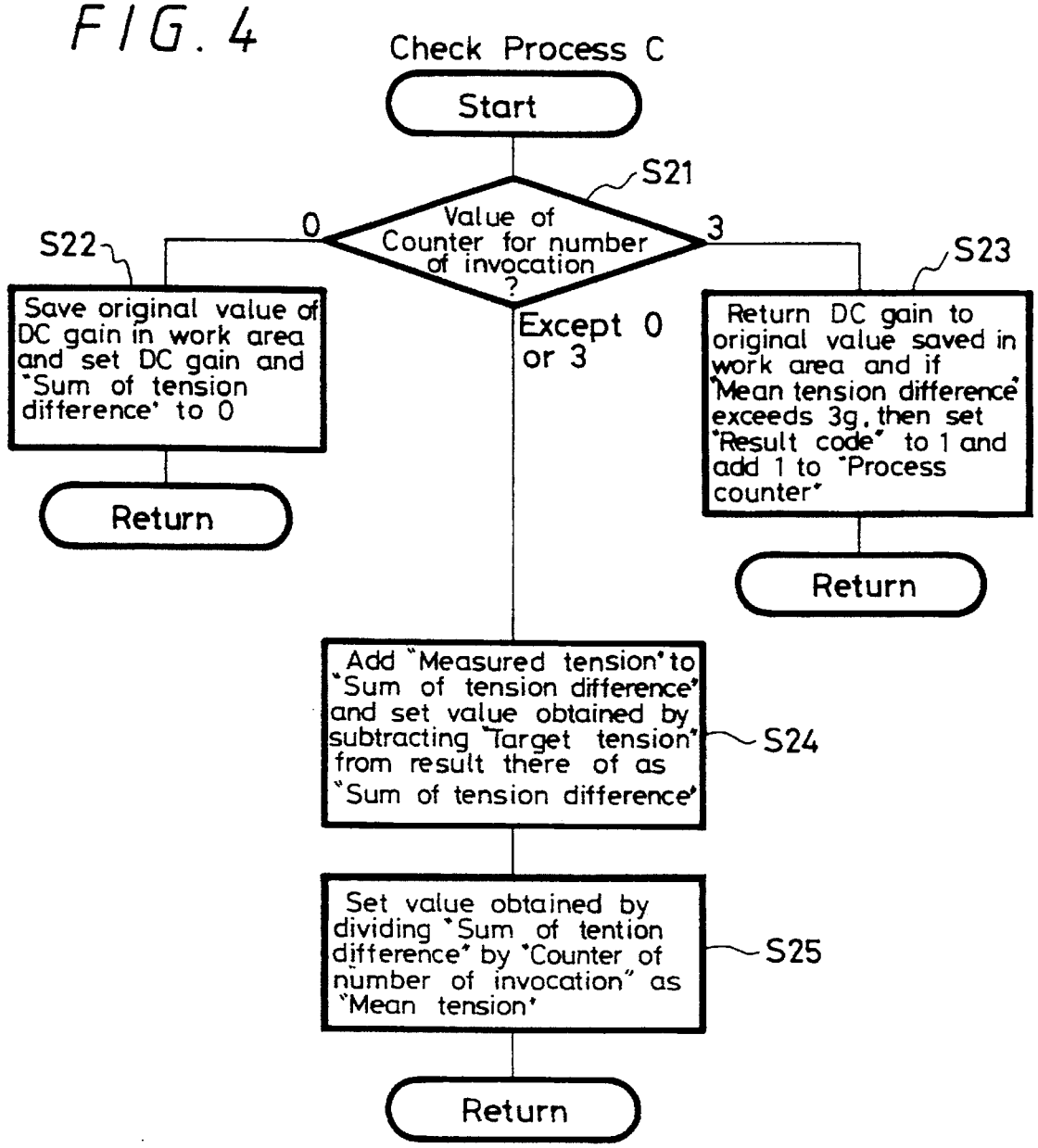
FIG. 4 is a diagram used to explain operation of the apparatus for detecting abnormality of the tape-tension detecting means of the magnetic recording apparatus according to one embodiment of the present invention.

As shown in FIG. 4, in the check process C for detecting concrete abnormality of the tension sensor by using these check processes A and B, first, if an equation of "the counter for the number of invocation"=0 is established at step S21, then at step S22, an original value of "DC feedback gain" is saved in a work area and values of "DC feedback gain" and "a sum of tension difference" are set to 0. Then, the process is returned. If the equation of "the counter of the number of invocation"=3 [sec] is established at step S21, then at step S23, the value of "the DC feedback gain" is returned to the original value saved in the work area and if "a mean tension difference" exceeds 3 [g], then "a result code" is set to 1 to add 1 to a value of "a process counter". Then, the process is returned.

If the value of "the counter of the number of invocation" is a value other than the above values, that is, 0 and 3 at step S21, then at step S24, a value of "the measured tension" is added to "the sum of tension difference" and a value obtained by subtracting "the target tension" from a result of the above addition is set as "the sum of the tension difference". At step S25, a value obtained by dividing "the sum of the tension difference" by "the counter of the number of invocation" is set as a value of "the mean tension". Then, the process is returned.

Figure 5:
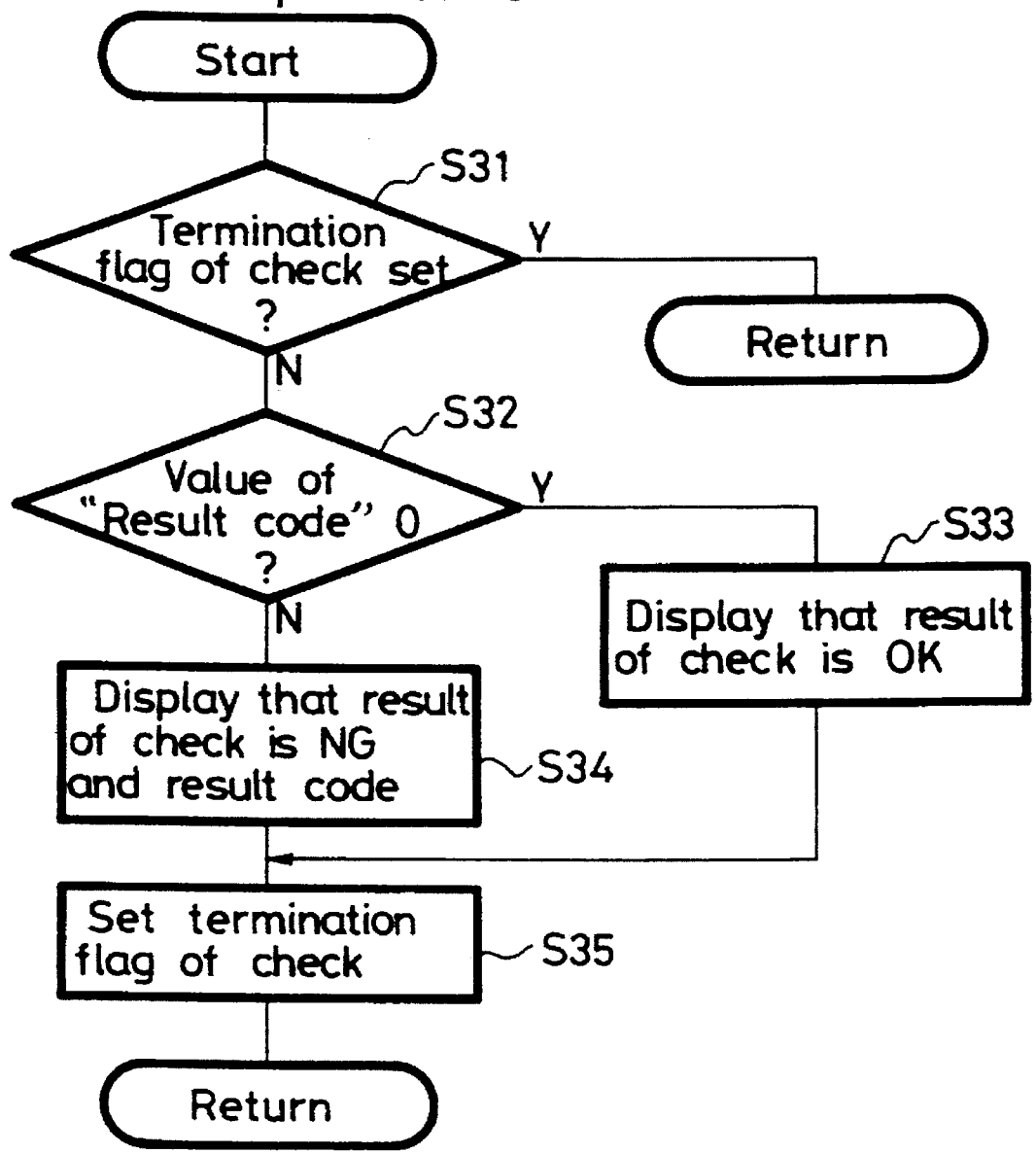
FIG. 5 is a diagram used to explain operation of the apparatus for detecting abnormality of the tape-tension detecting means of the magnetic recording apparatus according to one embodiment of the present invention.

As shown in FIG. 5, in a process for outputting a result of such detection of abnormality of the tension sensor, if a termination flag of a check is set at step S31, then the process is returned without any processing. If "the result code" is 0 at step S32, then a message of "OK" is output at step S33. If "the result code" is not 0 at step S32, then both a message of "NG" and the result code are displayed at step S34. The termination flag of the test is set at step S35, and then the process is returned.

Figure 6:
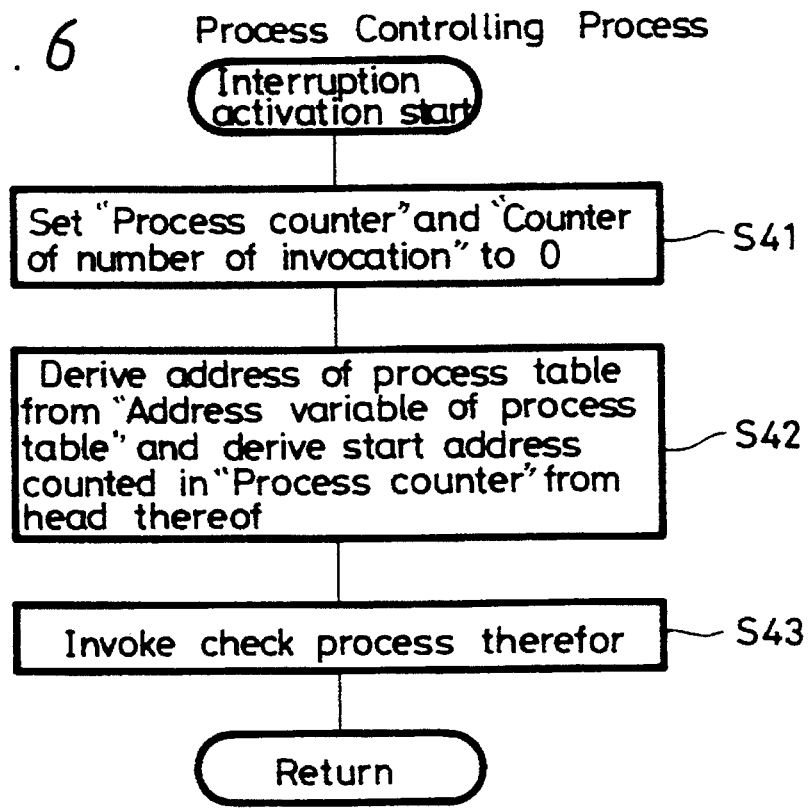
FIG. 6 is a diagram used to explain operation of the apparatus for detecting abnormality of the tape-tension detecting means of the magnetic recording apparatus according to one embodiment of the present invention.

As shown in FIG. 6, the process for controlling the process for such detection of abnormality of the tension sensor is activated by a timer interruption. At step S41 thereof, the values of "a process counter" and "the counter of the number of invocation" are set to 0. At step S42, an address of a process table is derived from "an address variable of the process table" and a start address counted in "the process counter" is derived from the head thereof. At step S43, a check program therefor is invoked. Then, the process is returned.

Figure 7:
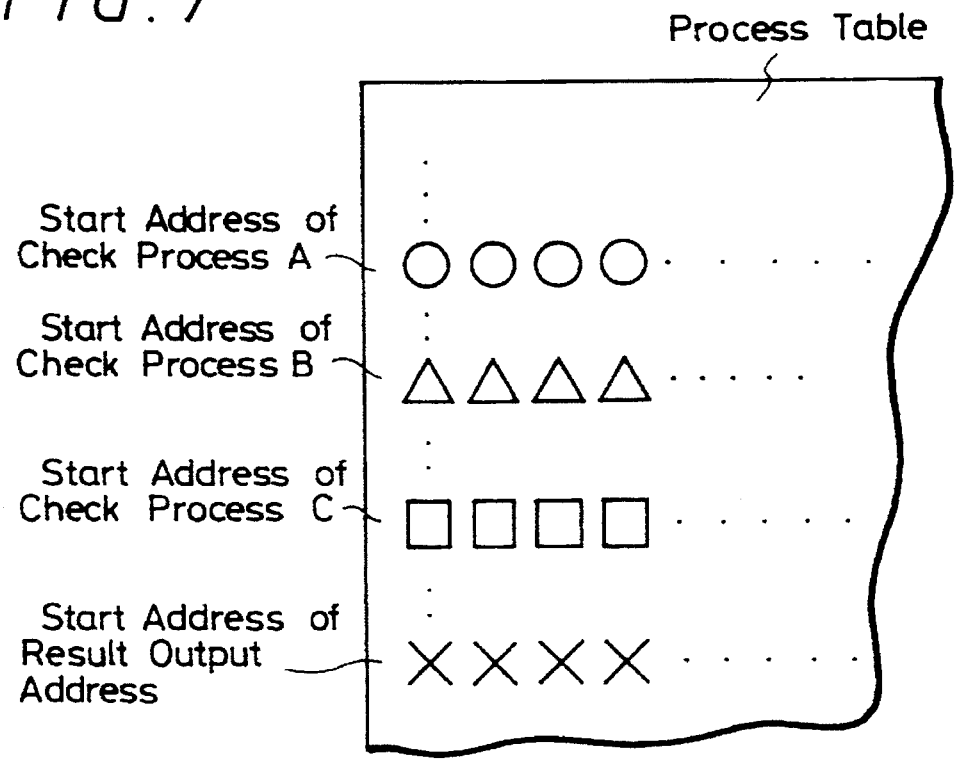
FIG. 7 is a diagram used to explain operation of the apparatus for detecting abnormality of the tape-tension detecting means of the magnetic recording apparatus according to one embodiment of the present invention.

As shown in FIG. 7, in the process table, a start address of the check process A, a start address of the check process B, a start address of the check process C and a start address of the result output process are stored. In the above embodiment, there is shown the case where when "the mean tension difference" exceeds "the target tension"by 3 [g], abnormality of the tension sensor is detected, while it is better to set that when "the mean tension difference" exceeds a maximum "target tension" of 45 [g]by 5 [g], the abnormality of the tension sensor is detected.

According to the above embodiment, there are provided the CPU 19, the supply-side reel motor 20 and the D/A convertor and motor driver 22 which drive the supply-side reel in an open-loop fashion with cutting off the supply-side reel servo drive, the CPU 19, the supply-side reel motor 20 and the FG counter 21 which set the target tension in the open loop made by the CPU 19, the supply-side reel motor 20 and the D/A converter and motor driver 22, and the CPU 19 and the nonvolatile storage 24 which compare the target tension obtained by the CPU 19, the supply-side reel motor 20 and the FG counter 21 and the tape tension detected by the tension sensor 13 and detects abnormality of the tension sensor 13. Therefore, fine fluctuation of the tape tension relative to the target tension is detected in the open loop, whereby the abnormality of the tension sensor 13 can be detected and the tape 2 can be prevented from being damaged.

According to the above embodiment, there is generated such supply-side reel torque that the backward tension of the supply-side reel becomes the above-mentioned target tension. Therefore, the fine fluctuation of the tape tension upon the loading of the tape is detected, whereby the abnormality of the tension sensor 13 can be detected and the tape 2 can be prevented from being damaged.

According to the above embodiment, the current value for driving the supply-side reel motor 20 is set so that the supply-side reel torque should be generated. Therefore, the target tension in the open loop is easily set and the fine fluctuation of the tape tension relative to the target tension is detected, whereby the abnormality of the tension sensor 13 can be detected and the tape 2 can be prevented from being damaged.

According to the above embodiment of the present invention, it is previously detected that the supply-side reel torque is free from abnormality. Therefore, the fine fluctuation of the tape tension relative to the target tension is detected with high accuracy, whereby the abnormality of the tension sensor 13 can be detected and the tape 2 can be prevented from being damaged.

According to the present invention described above, there are provided the supply-side-reel open-loop driving means for driving the supply-side reel in an open-loop fashion with cutting off the servo drive performed by the supply-side-reel servo driving means, the target-tension setting means for setting the target tension in the open loop made by the supply-side-reel open-loop driving means, and the means for detecting abnormality of tape-tension detecting means which compares the target tension obtained by the target-tension setting means and the tape tension detected by the tape-tension detecting means and detects abnormality of the tape-tension detecting means. Therefore, the fine fluctuation of the tape tension relative to the target tension is detected in the open loop, whereby the abnormality of the tape-tension detecting means can be detected and the tape can be prevented from being damaged.

According to the present invention described above, there is generated such supply-side reel torque that the backward tension of the supply-side-reel becomes the above-mentioned target tension. Therefore, the fine fluctuation upon the loading of the tape is detected, whereby the abnormality of the tape-tension detecting means can be detected and the tape can be prevented from being damaged.

According to the present invention described above, the current value for driving the supply-side reel motor is set so that the supply-side reel torque should be generated. Therefore, the target tension in the open loop is easily set and the fine fluctuation of the tape tension relative to the target tension is detected, whereby the abnormality of the tape-tension detecting means can be detected and the tape can be prevented from being damaged.

According to the present invention described above, it is previously detected that the supply-side reel torque is free from abnormality. Therefore, the fine fluctuation of the tape tension relative to the target tension is detected with high accuracy, whereby the abnormality of the tape-tension detecting means can be detected and the tape can be prevented from being damaged.

Having described preferred embodiments of the present invention with reference to the accompanying drawings, it is to be understood that the present invention is not limited to the above-mentioned embodiment and that various changes and modifications can be effected by one skilled in the art without departing from the spirit or scope of the present invention as defined in the appended claims.

What is claimed is:

1. An apparatus for detecting abnormality of a tape-tension detecting means for a magnetic recording apparatus comprising;

a tape-tension detecting means for detecting tension of a tape loaded on a predetermined tape traveling path from a supply-side reel to a takeup-side reel;

a supply-side-reel servo driving means for performing a servo-drive by controlling rotation of said supply-side reel on the basis of a detected value of tape tension detected by said tape-tension detecting means to thereby apply a tape tension in accordance with a tape traveling mode;

a supply-side-reel open-loop driving means for driving said supply-side reel in an open-loop fashion while cutting off servo drive performed by said supply-side-reel servo driving means;

a target-tension setting means for setting a target tension in the open loop made by said supply-side-reel open-loop driving means; and means for detecting abnormality of said tape-tension detecting means which compares said target tension set by said target-tension setting means and tape tension detected by said tape-tension detection means and detects abnormality of said tape-tension detecting means.

2. An apparatus for detecting abnormality of a tape-tension detecting means of a magnetic recording apparatus according to claim 1, wherein said target-tension setting means generates such a supply-side reel torque that backward tension of the supply-side reel becomes said target tension.

3. An apparatus for detecting abnormality of a tape-tension detecting means of a magnetic recording apparatus according to claim 2, wherein said target-tension setting means sets a current value for driving a supply-side reel motor so that said supply-side reel torque should be generated.

4. An apparatus for detecting abnormality of a tape-tension detecting means of a magnetic recording apparatus according to claim 1, wherein said target-tension setting means previously detects that said supply-side reel torque is free from abnormality.

5. An apparatus for detecting abnormality of a tape-tension detector for a magnetic recording apparatus comprising;

a tape-tension detector for detecting tension of a tape loaded on a predetermined tape traveling path from a supply-side reel to a takeup-side reel;

a supply-side-reel servo driver for performing a servo-drive by controlling rotation of said supply-side reel on the basis of a detected value of tape tension detected by said tape-tension detector to thereby apply a tape tension in accordance with a tape traveling mode;

a supply-side-reel open-loop driver for driving said supply-side reel in an open-loop fashion while cutting off servo drive performed by said supply-side-reel servo driver;

a target-tension setter for setting a target tension in the open loop made by said supply-side-reel open-loop driver; and an abnormality detector of said tape-tension detector which compares said target tension set by said target-tension setter and tape tension detected by said tape-tension detector and detects abnormality of said tape-tension detector.

6. An apparatus for detecting abnormality of a tape-tension detector of a magnetic recording apparatus according to claim 5, wherein said target-tension setter generates such a supply-side reel torque that backward tension of the supply-side reel becomes said target tension.

7. An apparatus for detecting abnormality of a tape-tension detector of a magnetic recording apparatus according to claim 6, wherein said target-tension setter sets a current value for driving a supply-side reel motor so that said supply-side reel torque should be generated.

8. An apparatus for detecting abnormality of a tape-tension detector of a magnetic recording apparatus according to claim 5, wherein said target-tension setter previously detects that said supply-side reel torque is free from abnormality.

* * * * *